US012113192B2

(12) United States Patent
Weileder et al.

(10) Patent No.: US 12,113,192 B2
(45) Date of Patent: Oct. 8, 2024

(54) BATTERY SYSTEM AND BATTERY MODULE

(71) Applicant: Bayerische Motoren Werke Aktiengesellschaft, Munich (DE)

(72) Inventors: Stephan Weileder, Munich (DE); Nicolas Flahaut, Munich (DE); Michael Huber, Munich (DE); Florian Einoegg, Munich (DE); Sebastian Siering, Munich (DE); Andreas Ring, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1448 days.

(21) Appl. No.: 15/097,875

(22) Filed: Apr. 13, 2016

(65) Prior Publication Data

US 2016/0233565 A1    Aug. 11, 2016

Related U.S. Application Data

(63) Continuation of application No. PCT/EP2014/074450, filed on Nov. 13, 2014.

(30) Foreign Application Priority Data

Dec. 11, 2013   (DE) .................... 10 2013 225 521.7

(51) Int. Cl.
| | | |
|---|---|---|
| *H01M 2/10* | (2006.01) | |
| *B60L 58/26* | (2019.01) | |
| *H01M 10/613* | (2014.01) | |
| *H01M 10/617* | (2014.01) | |
| *H01M 10/625* | (2014.01) | |
| *H01M 10/6556* | (2014.01) | |
| *H01M 10/656* | (2014.01) | |
| *H01M 10/6567* | (2014.01) | |

(Continued)

(52) U.S. Cl.
CPC ......... *H01M 10/6568* (2015.04); *B60L 58/26* (2019.02); *H01M 10/613* (2015.04);
(Continued)

(58) Field of Classification Search
None
See application file for complete search history.

(56) References Cited

U.S. PATENT DOCUMENTS

2008/0299446 A1* 12/2008 Kelly ................. H01M 2/1077
429/88
2009/0301700 A1    12/2009 German et al.
(Continued)

FOREIGN PATENT DOCUMENTS

| CN | 102237561 A | 11/2011 |
| CN | 102484299 A | 5/2012 |

(Continued)

OTHER PUBLICATIONS

International Search Report (PCT/ISA/210) issued in PCT Application No. PCT/EP2014/074450 dated Feb. 5, 2015 with English translation (seven pages).

(Continued)

*Primary Examiner* — Zhongqing Wei
(74) *Attorney, Agent, or Firm* — Crowell & Moring LLP (57) ABSTRACT

A battery module is provided having a cooling apparatus including at least one first line and at least one second line, wherein the first line and the second line conduct a fluid and absorb heat from cells of the battery module and transfer the heat to the fluid. The first line and the second line extend perpendicular to the cells of the battery module. The first line and the second line are arranged parallel to one another. A flow direction of the fluid in the first line is opposite a flow direction of the fluid in the second line.

18 Claims, 5 Drawing Sheets

(51) Int. Cl.
- *H01M 10/6568* (2014.01)
- *H01M 10/6569* (2014.01)
- *H01M 50/209* (2021.01)
- *H01M 50/24* (2021.01)
- *H01M 50/249* (2021.01)

(52) U.S. Cl.
CPC ....... *H01M 10/617* (2015.04); *H01M 10/625* (2015.04); *H01M 10/6556* (2015.04); *H01M 10/656* (2015.04); *H01M 10/6567* (2015.04); *H01M 10/6569* (2015.04); *H01M 50/209* (2021.01); *H01M 50/24* (2021.01); *H01M 50/249* (2021.01); *B60L 2240/545* (2013.01); *H01M 2220/20* (2013.01); *Y02T 10/70* (2013.01)

(56) References Cited

U.S. PATENT DOCUMENTS

2011/0262794 A1* 10/2011 Yoon ................. H01M 10/486 429/120
2011/0281145 A1    11/2011 TenHouten
2012/0003522 A1     1/2012 Fuhr et al.
2013/0266838 A1    10/2013 Von Borck et al.

FOREIGN PATENT DOCUMENTS

| | | | |
|---|---|---|---|
| CN | 103038919 A | 4/2013 | |
| CN | 103262334 A | 8/2013 | |
| CN | 103427136 A | 12/2013 | |
| DE | 102010025656 A1 * | 1/2012 | ............ B60L 3/0046 |
| WO | WO 2007/076985 A2 | 7/2007 | |
| WO | WO 2011/060074 A2 | 5/2011 | |

OTHER PUBLICATIONS

German-language Written Opinion (PCT/ISA/237) issued in PCT Application No. PCT/EP2014/074450 dated Feb. 5, 2015 (six pages).

German Search Report issued in counterpart German Application No. 10 2013 225 521.7 dated Jul. 24, 2014 with partial English translation (13 pages).

Chinese-language Office Action issued in counterpart Chinese Application No. 201480057128.X dated May 4, 2017 with English translation (Fourteen (14) pages).

* cited by examiner

BATTERY SYSTEM AND BATTERY MODULE

CROSS REFERENCE TO RELATED APPLICATIONS

This application is a continuation of PCT International Application No. PCT/EP2014/074450, filed Nov. 13, 2014, which claims priority under 35 U.S.C. § 119 from German Patent Application No. 10 2013 225 521.7, filed Dec. 11, 2013, the entire disclosures of which are herein expressly incorporated by reference.

BACKGROUND AND SUMMARY OF THE INVENTION

The present invention relates to a battery module, by which electrical energy can be stored. The invention furthermore relates to a battery system, which, in particular, includes a plurality of battery modules of this kind. Finally, the invention relates to a vehicle which includes a battery module for a battery system.

Particularly in electric vehicles and hybrid vehicles, use is made of battery systems to enable electric components of the vehicles to be supplied with electrical energy. To ensure range, service life and available power, defined temperature management of the battery systems and of the battery modules is necessary. In this context, it is necessary to keep temperature spreads between individual battery modules or individual cells of the battery modules as small as possible.

To maintain a defined temperature, a number of approaches are possible. On the one hand, the battery module can be surrounded by a coolant in order in this way to cool the battery module. As an alternative, it is also possible to surround the battery module with a direct refrigerant, allowing a higher cooling capacity.

In vehicles, there is often a refrigerating circuit, by means of which an interior of the motor vehicle is air-conditioned. A refrigerating circuit of this kind can also be used for temperature management of battery modules. However, there is the problem here that a pressure difference in the refrigerating circuit falls at low external temperatures, as a result of which the mass flow of the refrigerant is not sufficient to provide adequate cooling of the battery system and/or the battery module. A temperature spread therefore often arises within the individual cells of the battery modules of the battery system.

It is therefore the object of the invention to provide a battery module which allows safe and reliable cooling of cells of the battery module while being simple and inexpensive to manufacture and assemble.

This and other objects are achieved by embodiments of the invention. A battery module is provided having a cooling apparatus, said module comprising at least one first line and at least one second line. The first line and the second line carry a fluid, wherein heat can be transferred from the cells of the battery module to the fluid. According to the invention, it is envisaged that the first line and the second line extend perpendicularly to the cells of the battery module. "Perpendicularly" is to be taken to mean, in particular, an angle of 90° or at least substantially 90°. In particular, the cells are units of the battery module which store and release electrical energy. In particular, the heat which arises during this process is to be carried away by the first line and the second line. For this purpose, provision is preferably made for the first line and/or the second line to be taken past each battery module cell to be cooled, with the result that heat from the cells is transferred to the fluid in the first line and/or the second line. As a particularly preferred option, it is envisaged that the first line and/or the second line is in heat transferring contact with all the cells of the battery module, thus allowing all the cells of the battery module to be cooled by means of the first line and/or the second line. As a—likewise particularly preferred—option, it is envisaged that both the first line and the second line absorb heat from all the cells of the battery module and transfer it to the fluid. The cells advantageously have a longitudinal direction and a transverse direction, wherein a dimension of the cells in the longitudinal direction is greater than a dimension of the cells in the transverse direction. It is advantageous if the first line and/or the second line extend parallel to the transverse direction and thus orthogonally with respect to the longitudinal direction. Moreover, the first line and the second line are arranged parallel to one another, wherein a flow direction of the fluid in the first line is opposite to a flow direction of the fluid in the second line. Efficient and uniform cooling of the battery module is thus achieved.

As already explained, a battery module is constructed from individual cells. These cells should each be a unit closed off from the environment, within which the electrode material required to store electrical energy is arranged. These cells can preferably be designed as prismatically shaped Li-ion storage cells, which can usually have a storage cell voltage of the order of 2.8 to 4.2 volts. Within the battery module, the individual storage cells are connected electrically in series to obtain a battery module voltage.

Provision is preferably made for each cell of the battery module to have a compensating medium. By means of the compensating medium, it is advantageously possible to compensate a temperature difference between the first line and the second line. A uniform temperature within the cell can therefore be achieved with the cooling apparatus according to the invention.

Provision is furthermore preferably made for each cell to have a housing, by which a temperature difference between the first line and the second line can be compensated. Thus, it is preferably ensured that a temperature within the cell is uniform. In this way, damage to, and hence a shorter service life of, the cells are advantageously avoided.

The fluid is preferably a refrigerant or a coolant. The use of refrigerants is advantageous particularly where ambient temperatures of the battery module are higher than a predefined temperature at which the cells of the battery module are to be held. The coolant which can be used as an alternative simplifies the construction of the cooling apparatus and hence of the entire battery module.

The invention furthermore relates to a battery system. The battery system includes a multiplicity of the battery modules described above. Here, the battery modules are arranged in such a way that the first lines and the second lines of the battery modules extend parallel to one another, wherein a flow direction of the fluid within the first lines is identical in adjacent battery modules. Thus, in particular, the flow direction of the fluid within the second lines is also identical in adjacent battery modules.

As an alternative, the battery system is configured such that the battery modules are arranged so that the first lines and the second lines of the battery modules extend parallel to one another, wherein a flow direction of the fluid within the first lines is opposite in adjacent battery modules.

As a particularly preferred option, the abovementioned battery systems are designed in such a way that the first lines of the battery modules and the second lines of the battery modules are connected in series between a first battery module and a last battery module. At the same time, it is envisaged that the first line of the first battery module receives the fluid and the second line of the first battery module discharges the fluid. It is furthermore envisaged that a connecting element connects the first line of the last battery module and the second line of the last battery module. In this way, a flow of the fluid from the first line of the first battery module, which receives the fluid, to the second line of the first battery module, which discharges the fluid, can be achieved, in particular, wherein the fluid passes through all the first lines and all the second lines of all the battery modules. Since the fluid initially passes through all the first lines and then all the second lines, a cooling capacity is always averaged out between the first line and the second line for each battery module. This average is advantageously identical or at least virtually identical for all battery modules of the battery system. A spread of temperatures within the battery system is thus avoided in an effective manner.

Alternatively, the battery system described above is particularly preferably designed in such a way that each first line of each battery module is connected to at least one first manifold, wherein the first manifold receives the fluid. As a particularly preferred option, each second line of each battery module is furthermore connected to at least one second manifold, wherein the second manifold discharges the fluid. Finally, at least one connecting element is provided for each battery module, connecting the first line and the second line of the battery module. Parallel interconnection of each battery module is thus achieved. A temperature spread between the battery modules is therefore prevented in an effective manner since each battery module is supplied with the same fluid, and therefore each battery module releases the same amount of heat to the fluid. Once again, provision is preferably made for an average of the cooling capacity between the first line and the second line to be identical or at least virtually identical in each battery module. A temperature spread within the battery system can therefore also be avoided in an effective manner by means of the parallel circuit.

Finally, the battery system described above is alternatively preferably configured in such a way that the battery system is subdivided into a multiplicity of subregions having a predefined number of battery modules. In this case, the cooling systems of the battery modules within a subregion are, in particular, interconnected in series with one another, while the series circuits of the individual subregions are interconnected in parallel. Thus, the first lines and the second lines of the battery modules within a subregion are connected in series between a first battery module and a last battery module. There is furthermore a connecting element, which connects the first line and the second line of the last battery module of each subregion. In this way, the series circuit is achieved. The first line of the first battery module of each subregion is furthermore connected to at least one first manifold, wherein the first manifold receives the fluid. In addition, the second line of the first battery module of each subregion is connected to at least one second manifold, wherein the second manifold discharges the fluid. By means of this mixture of series circuitry and parallel circuitry, advantageous distribution of the fluid within the battery system is ensured, in particular. Thus, optimum cooling of the battery modules is available. At the same time, however, it is ensured that an average of the cooling capacity between the first line and the second line is identical for each battery module at all times. A temperature spread within the battery system can thereby be avoided in an effective manner.

The invention furthermore relates to a vehicle which includes a battery module described above and/or a battery system described above. In particular, the vehicle is an electric vehicle or a hybrid vehicle, wherein the battery module and/or the battery system can advantageously be used to supply energy to a drive of the vehicle.

By means of the battery module according to the invention and/or the battery system according to the invention, the range, service life and/or performance of electric vehicles and/or hybrid vehicles is adequately ensured by avoiding temperature spreads. Thus, uniform cooling can be achieved at all times.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
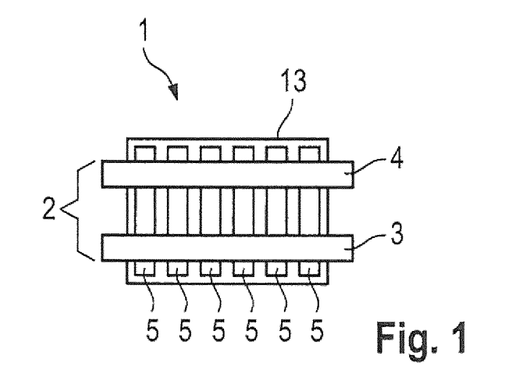
FIG. 1 is a schematic illustration of a battery module according to one illustrative embodiment of the invention.

FIG. 1 shows a battery module 1 according to one illustrative embodiment of the invention. The battery module 1 has a cell body 13, in which individual cells 5 of the battery module 1 are arranged. The individual cells 5 are used to store and discharge electrical energy. Since power losses occur as heat both when storing and when discharging the electrical energy, the individual cells 5 must be cooled in order to avoid overheating of the cells 5. Otherwise, the overheating of the cells 5 would significantly reduce the service life and power of the cells 5, and hence of the battery module 1.

To cool the cells 5, the battery module 1 has a cooling apparatus 2. The cooling apparatus 2 includes a first line 3 and a second line 4. A fluid which absorbs heat energy from the cells 5 can be carried within the first line 3 and the second line 4. The fluid is preferably either a coolant or a refrigerant. The first line 3 and the second line 4 are arranged parallel to one another and extend perpendicularly to the cells 5. At the same time, the first line 3 and the second line 4 are advantageously arranged symmetrically with respect to the cells 5. This ensures that a constant average of the cooling capacity of the first line 3 and the second line 4 is established at all times, thus ensuring that each cell 5 receives optimum and uniform cooling.

Figure 2:
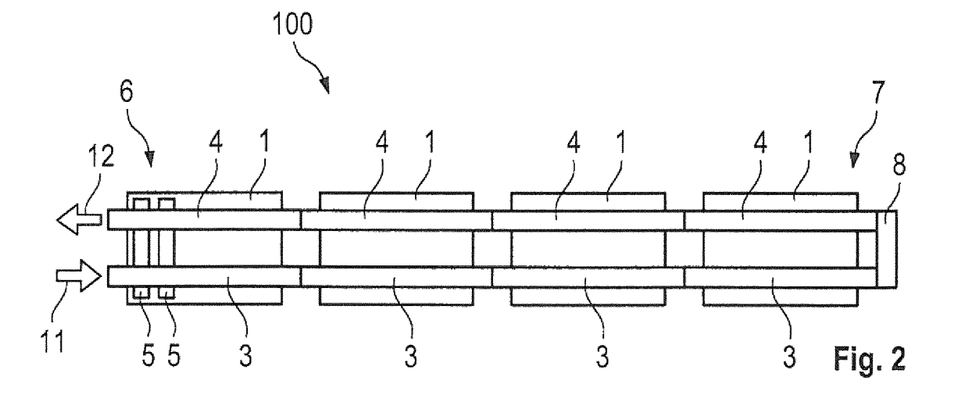
FIG. 2 is a schematic embodiment of a battery system according to a first illustrative embodiment of the invention.

FIG. 2 shows a battery system 100 according to a first illustrative embodiment of the invention. In this case, the individual battery cells 1 from FIG. 1 are arranged in a series circuit based on the counterflow principle. For this purpose, the battery modules 1 are arranged spatially in series. All the first lines 3 are connected to one another, as are all the second lines 4 of all the battery modules 1. Thus, all the first lines 3 are interconnected in a series circuit from a first battery module 6 to a last battery module 7. On the last battery module 7, there is a connecting element 8, which connects the first line 3 and the second line 4. The first battery module 6 has a fluid inlet 11 and a fluid outlet 12. The first line 3 is connected to the fluid inlet 11, while the second line 4 is connected to the fluid outlet 12.

The battery system 100 according to the first illustrative embodiment is therefore designed in such a way that the first battery module 6 receives a fluid into the first line 3 from the fluid inlet 11, wherein the fluid then passes through all the first lines 3 until the fluid in the last battery module 7 is transferred into the second line 4 of the last battery module 7 by the connecting element 8. From the last battery module 7, the fluid is passed through all the second lines 4 of all the battery modules 1 until the fluid is discharged to the fluid outlet 12 in the first battery module 6 through the second line 4 of the first battery module 6. The fluid thus first of all passes through all the battery modules 1 and then passes through all the battery modules 1 once again in the opposite direction. An average in the cooling capacity is therefore established by the fluid, this average being identical or at least virtually identical for all the battery modules 1. This results from the fact that the first battery module 6 has the highest cooling capacity in the entire battery system 100 at the first line 3 but has the lowest cooling capacity in the battery system 100 at the second line 4, for example. In contrast, the cooling capacity at the first line 3 and at the second line 4 is virtually identical in the last battery module 7. By means of the interconnection, according to the invention, of the cooling apparatuses 2 of the battery modules 1, the battery system 100 ensures that a temperature spread of the battery modules 1 is almost entirely avoided.

Figure 3:
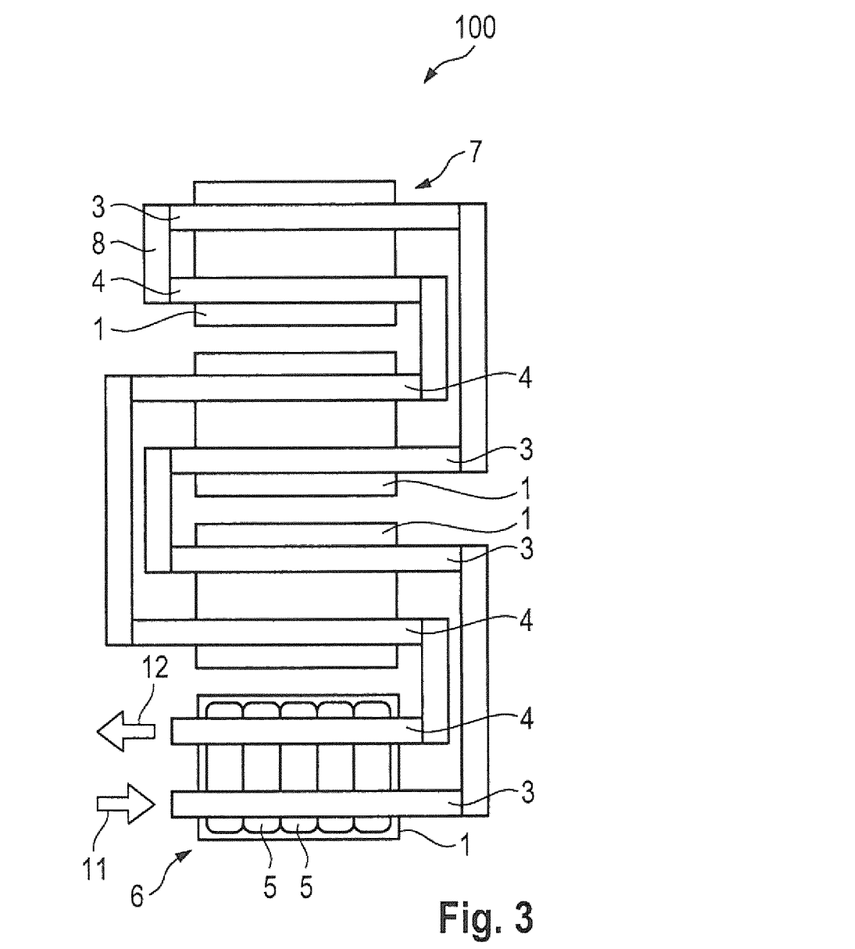
FIG. 3 is a schematic embodiment of a battery system according to a second illustrative embodiment of the invention.

FIG. 3 shows a battery system 100 according to a second illustrative embodiment of the invention. In this illustrative embodiment, the cooling apparatuses 2 of the battery modules 1 of the battery system 100 are interconnected in a meandering shape. For this purpose, the battery modules 1 are arranged spatially adjacent to one another. In this case, the mode of action of the interconnection of the cooling apparatuses 2 is identical with that in the first illustrative embodiment. Identical reference signs therefore indicate identical components or functionally identical components to those in the first illustrative embodiment.

Figure 4:
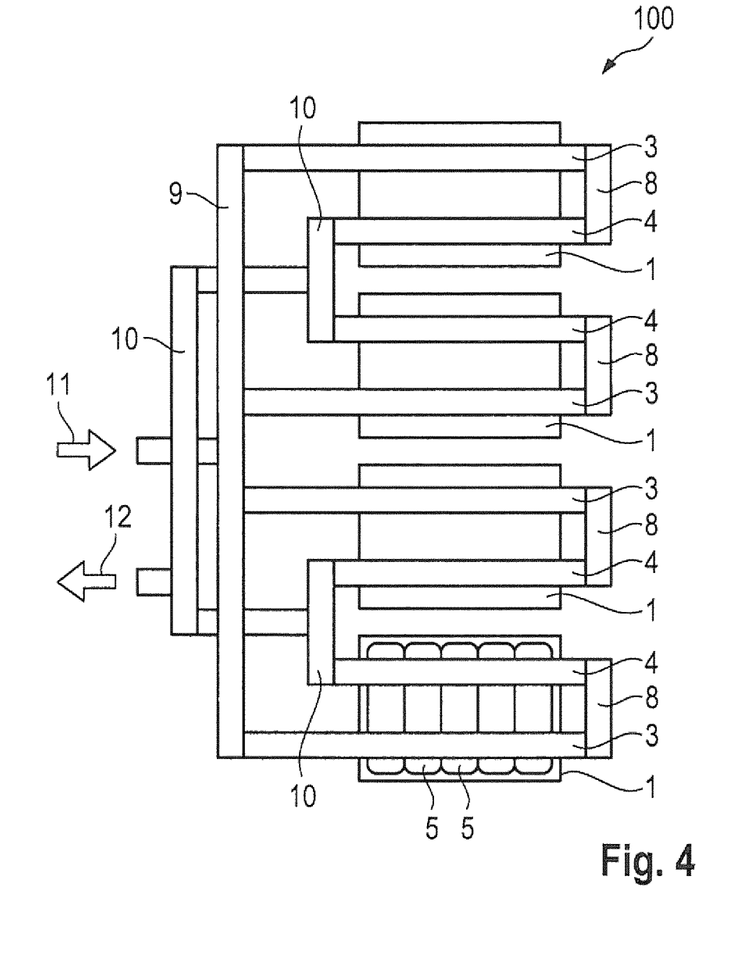
FIG. 4 is a schematic embodiment of a battery system according to a third illustrative embodiment of the invention.

FIG. 4 shows a battery system 100 according to a third illustrative embodiment of the invention. In this case, the cooling apparatuses 2 of the battery modules 1 are interconnected in parallel. Each first line 3 of each battery module 1 therefore has a connection to a first manifold 9. The first manifold 9, in turn, has a fluid inlet 11, with the result that the manifold 9 receives a fluid and distributes it to the individual first lines 3 of all the battery modules 1. Each battery module 1 has a connecting element 8, which in each case connects the first line 3 to the second line 4 of each battery module 1. The second lines 4 of each battery module 1 are, in turn, connected to a fluid outlet 12 by two second manifolds 10.

This applies especially when the fluid is a coolant. If the fluid is a refrigerant, the number of first manifolds 9 and of second manifolds 10, which is arbitrary, is advantageously limited to a predefined maximum in order to ensure uniform distribution of the refrigerant. Owing to the parallel interconnection, the cooling capacity in all the battery modules 1 is identical since all the battery modules 1 receive the same quantity of fluid from the fluid inlet 11 via the first manifold 9. After having been transferred from the first line 3 to the second line 4 of each battery module 1 via the connecting element 8, the fluid is discharged through the second manifold 10 and fed to the fluid outlet 12. A temperature spread between the individual battery modules 1 is thus avoided in an effective manner in the battery system 100 according to the third illustrative embodiment too.

Figure 5:
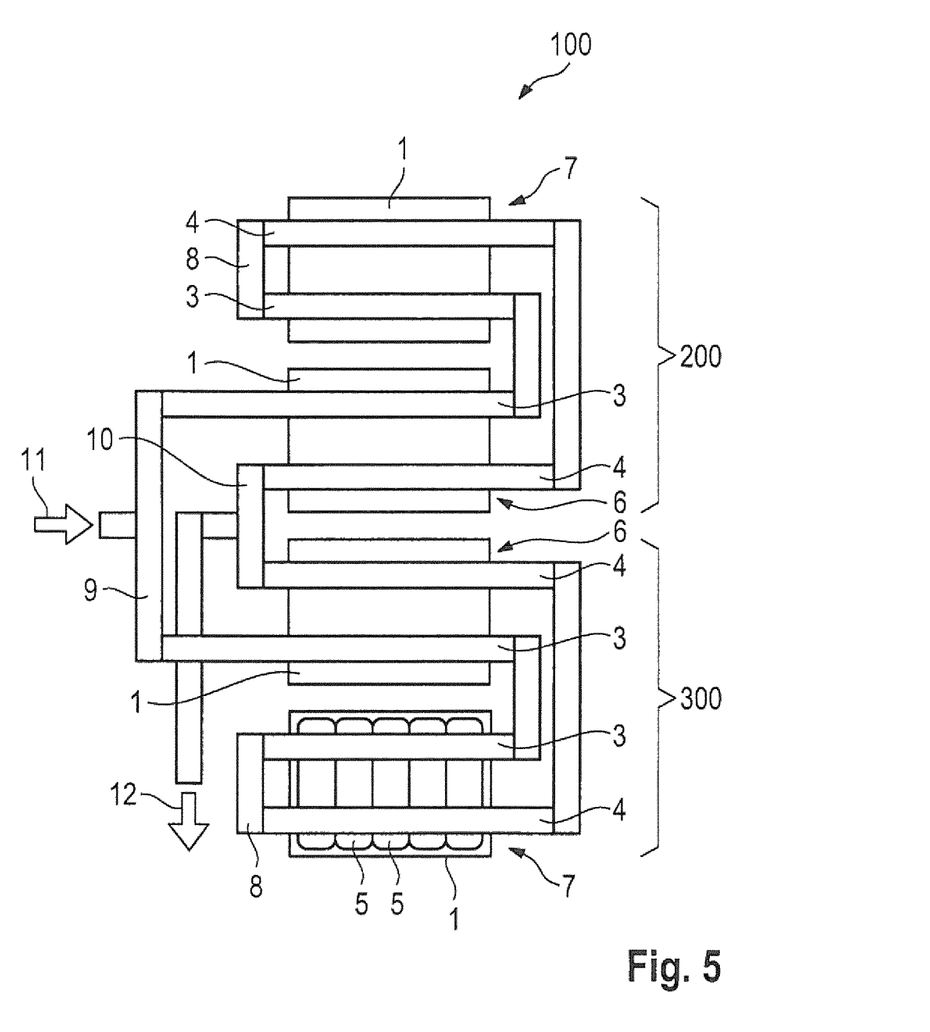
FIG. 5 is a schematic embodiment of a battery system according to a fourth illustrative embodiment of the invention.

FIG. 5 shows a battery system 100 according to a fourth illustrative embodiment of the invention. The fourth illustrative embodiment shows a combined parallel interconnection and meandering interconnection. For this purpose, the battery system 100 is subdivided into a first subregion 200 and a second subregion 300. Within the first subregion 200 and within the second subregion 300, the battery modules 1 are interconnected in a meandering shape and in series from a first battery module 6 to a last battery module 7. All the first lines 3 of all the battery modules 1 of the first subregion 200 and all the second lines 4 of all the battery modules 1 of the first subregion 200 are therefore connected to one another. Likewise, all the first lines 3 of all the battery modules 1 of the second subregion 300 are connected to one another, and all the second lines 4 of all the battery modules 1 of the second subregion 300 are also connected to one another. The last battery modules 7 of the first subregion 200 and of the second subregion 300 have a connecting element 8, by means of which the first line 3 of the last battery module 7 is connected to the second line 4 of the last battery module 7. The interconnection within the first subregion 200 and within the second subregion 300 thus allows a fluid to be transported from the first line 3 of the respective first battery module 6, through all the first lines 3 and all the second lines 4 of all the battery modules 1 of the respective subregion 200, 300, to the second line 4 of the first battery module 6.

In order to receive a fluid, the first lines 3 of the first battery module 6 are connected to a first manifold 9. The first manifold 9 is connected to a fluid inlet 11, allowing the fluid to be fed into the first lines 3 of the first battery modules 6. Likewise, the second lines 4 of the first battery modules 6 are connected to a second manifold 10. The second manifold 10, in turn, is connected to a fluid outlet 12, allowing the fluid to be discharged via the second lines 4 of the first battery modules 6.

The fourth illustrative embodiment shows a battery system 100 in which a multiplicity of battery modules 1 can advantageously be interconnected. However, since it is only with difficulty that refrigerant, in particular, can be distributed uniformly by manifolds, the fourth illustrative embodiment of the battery system 100 offers an advantageous interconnection option to enable a large number of battery modules 1 to be cooled nonetheless.

Figure 6:
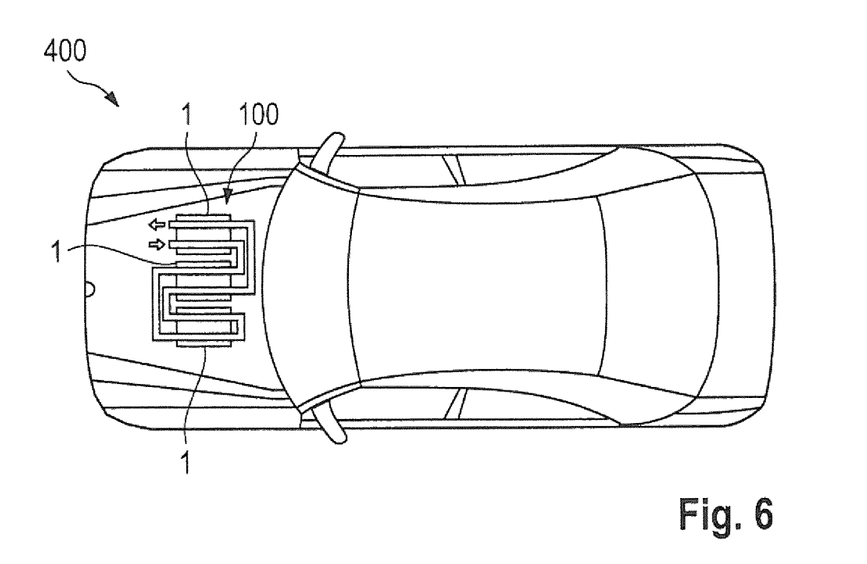
FIG. 6 is a vehicle according to one illustrative embodiment of the invention.

FIG. 6 shows a vehicle 400 according to one illustrative embodiment of the invention. In particular, the vehicle 400 is an electric vehicle or a hybrid vehicle. To drive an electric motor of the vehicle 400, there is a battery system 100. The battery system 100 comprises a plurality of battery modules 3, which store electrical energy and discharge electrical energy to the electric motor. Together with the cooling apparatus, according to the invention, of the battery modules 1, there is therefore reliable cooling of the battery modules 1, thus maximizing the power and service life of the battery system 100.

LIST OF REFERENCE SIGNS 1 battery module
2 cooling apparatus 3 first line
4 second line
5 cell
6 first battery module
7 last battery module
8 connecting element
9 first manifold
10 second manifold
11 fluid inlet
12 fluid outlet
100 battery system
200 first subregion
300 second subregion
400 vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery module, comprising:
an array of battery cells; and
a cooling apparatus having a first line and a second line, each carrying a fluid flowing therein so as to each independently absorb heat from the cells of the battery module and transfer said heat to the fluid,
wherein the first line and the second line each extend perpendicular to the cells and parallel to one another across the array, an outlet of the first line is fluidically coupled to an inlet of the second line, and a flow direction of the fluid in the first line is opposite to a flow direction of the fluid in the second line, such that the cooling capacity of the fluid in the first line is greater than the cooling capacity of the fluid in the second line, and such that the cooling capacity of the fluid flowing through the first line and the second line is averaged.

2. The battery module according to claim 1, wherein each cell of the battery module has a compensating medium by which a temperature difference between the first line and the second line is compensated.

3. The battery module according to claim 1, wherein each cell of the battery module has a housing by which a temperature difference between the first line and the second line is compensated.

4. The battery module according to claim 1, wherein the fluid is a refrigerant or a coolant.

5. A battery system comprising a multiplicity of battery modules, each battery module comprising:
an array of battery cells; and
a cooling apparatus having a first line and a second line, each carrying a fluid flowing therein so as to each independently absorb heat from the cells of the battery module and transfer said heat to the fluid,
wherein the first line and the second line each extend perpendicular to the cells and parallel to one another across the array, an outlet of the first line is fluidically coupled to an inlet of the second line, and a flow direction of the fluid in the first line is opposite to a flow direction of the fluid in the second line, such that the cooling capacity of the fluid in the first line is greater than the cooling capacity of the fluid in the second line, and such that the cooling capacity of the fluid flowing through the first line and the second line is averaged, and
wherein the multiplicity of battery modules are arranged such that the first lines and the second lines of the battery modules extend parallel to one another, and a flow direction of the fluid within the first lines is identical in adjacent battery modules.

6. The battery system according to claim 5, wherein:
the first lines of the battery modules and the second lines of the battery modules are connected in series between a first battery module and a last battery module,
the first line of the first battery module receives the fluid and the second line of the first battery modules discharges the fluid, and
a connecting element connects the first line of the last battery module and the second line of the last battery module.

7. The battery system according to claim 5, wherein:
each first line of each battery module is connected to at least one first manifold which receives the fluid,
each second line of each battery module is connected to at least one second manifold which discharges the fluid, and
one connecting element in each case connects the first line and the second line of each battery module.

8. The battery system according to claim 5, wherein:
the battery system is subdivided into a multiplicity of subregions having a predefined number of battery modules,
the first lines of the battery modules within a subregion and the second lines of the battery modules within a subregion are connected in series between a first battery module and a last battery module,
a connecting element connects the first line and the second line of the last battery module of each subregion,
the first line of the first battery modules of each subregion is connected to at least one first manifold which receives the fluid, and
the second line of the first battery modules of each subregion is connected to at least one second manifold which discharges the fluid.

9. A battery system comprising a multiplicity of battery modules, each battery module comprising:
an array of battery cells; and
a cooling apparatus having a first line and a second line, each carrying a fluid flowing therein so as to each independently absorb heat from the cells of the battery module and transfer said heat to the fluid,
wherein the first line and the second line each extend perpendicular to the cells and parallel to one another across the array, an outlet of the first line is fluidically coupled to an inlet of the second line, and a flow direction of the fluid in the first line is opposite to a flow direction of the fluid in the second line, such that the cooling capacity of the fluid in the first line is greater than the cooling capacity of the fluid in the second line, and such that the cooling capacity of the fluid flowing through the first line and the second line is averaged, and
wherein the battery modules are arranged such that the first lines and the second lines of the battery modules extend parallel to one another, and a flow direction of the fluid within the first lines is opposite in adjacent battery modules.

10. The battery system according to claim 9, wherein:
the first lines of the battery modules and the second lines of the battery modules are connected in series between a first battery module and a last battery module, the first line of the first battery module receives the fluid and the second line of the first battery modules discharges the fluid, and a connecting element connects the first line of the last battery module and the second line of the last battery module.

11. The battery system according to claim 9, wherein:

each first line of each battery module is connected to at least one first manifold which receives the fluid, each second line of each battery module is connected to at least one second manifold which discharges the fluid, and one connecting element in each case connects the first line and the second line of each battery module.

12. The battery system according to claim 9, wherein:

the battery system is subdivided into a multiplicity of subregions having a predefined number of battery modules, the first lines of the battery modules within a subregion and the second lines of the battery modules within a subregion are connected in series between a first battery module and a last battery module, a connecting element connects the first line and the second line of the last battery module of each subregion, the first line of the first battery modules of each subregion is connected to at least one first manifold which receives the fluid, and the second line of the first battery modules of each subregion is connected to at least one second manifold which discharges the fluid.

13. A vehicle, comprising:

a battery module, the battery module comprising:

an array of battery cells; and a cooling apparatus having a first line and a second line, each carrying a fluid flowing therein so as to each independently absorb heat from the cells of the battery module and transfer said heat to the fluid, wherein the first line and the second line each extend perpendicular to the cells and parallel to one another across the array, an outlet of the first line is fluidically coupled to an inlet of the second line, and a flow direction of the fluid in the first line is opposite to a flow direction of the fluid in the second line, such that the cooling capacity of the fluid in the first line is greater than the cooling capacity of the fluid in the second line, and such that the cooling capacity of the fluid flowing through the first line and the second line is averaged.

14. The vehicle according to claim 13, wherein each cell of the battery module has a compensating medium by which a temperature difference between the first line and the second line is compensated.

15. The vehicle according to claim 13, wherein each cell of the battery module has a housing by which a temperature difference between the first line and the second line is compensated.

16. The vehicle according to claim 13, wherein the fluid is a refrigerant or a coolant.

17. The vehicle according to claim 13, wherein a multiplicity of battery modules are provided, and wherein the battery modules are arranged such that the first lines and the second lines of the battery modules extend parallel to one another, and further wherein a flow direction of the fluid within the first lines is identical in adjacent battery modules.

18. The vehicle according to claim 13, wherein a multiplicity of battery modules are provided, and wherein the battery modules are arranged such that the first lines and the second lines of the battery modules extend parallel to one another, and further wherein a flow direction of the fluid within the first lines is opposite in adjacent battery modules.

* * * * *